United States Patent Office 2,808,415
Patented Oct. 1, 1957

2,808,415

$\Delta^{4,8(9)}$-3,20-DIKETO-11,17-DIHYDROXY-21-OXYGENATED-PREGNADIENES AND PROCESSES OF PREPARING THE SAME Lewis H. Sarett, Princeton, N. J., assignor to Merck & Co., Inc., Rahway, N. J., a corporation of New Jersey No Drawing. Original application January 25, 1955, Serial No. 483,858. Divided and this application October 31, 1955, Serial No. 544,076

7 Claims. (Cl. 260—397.45)

This invention is concerned generally with novel steroid compounds and processes of preparing them. More particularly, it relates to $\Delta^{4,8(9)}$-3,20-diketo-11,17-dihydroxy-21-oxygenated-pregnadiene compounds, and with processes for preparing these novel $\Delta^{4,8(9)}$-3,20-diketo-11,17-dihydroxy-21-oxygenated-pregnadiene compounds. These new compounds possess pharmacological activity similar to that shown by cortisone and are thus of value in the treatment of arthritis and related diseases. Moreover, in addition to possessing cortisone-activity, these $\Delta^{4,8(9)}$-3,20-diketo-11,17-dihydroxy-21-oxygenated-pregnadienes differ from cortisone in being relatively free from undesired side effects such as sodium or water retention action.

This application is a division of co-pending application Serial No. 483,858, filed January 25, 1955.

These $\Delta^{4,8(9)}$-3,20-diketo-11,17-dihydroxy-21-oxygenated-pregnadiene compounds, subject of the present invention, may be chemically represented as follows:

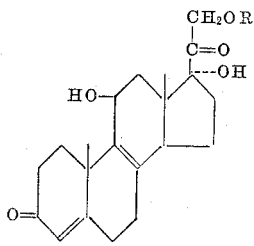

wherein R is hydrogen or an acyl radical.

The $\Delta^{4,8(9)}$-3,20-diketo-11,17-dihydroxy-21-oxygenated-pregnadienes are conveniently prepared starting with the known 9-bromo-cortisone. The 9-bromo-cortisone is reacted with a dehydrohalogenating agent such as collidine to produce $\Delta^{4,8(9)}$-3,11,20-triketo-17,21-dihydroxy-pregnadiene which is reacted with semicarbazide to form the corresponding 3,20-bis-semicarbazone which, upon reaction with an alkali metal borohydride, such as sodium borohydride in aqueous tetrahydrofuran, is converted to $\Delta^{4,8(9)}$-3,20-diketo-11,17,21-trihydroxy-pregnadiene 3,20-bis-semicarbazone. The latter compound is then reacted with an aqueous mineral acid solution in contact with a water-immiscible solvent such as chloroform to produce $\Delta^{4,8(9)}$-3,20-diketo-11,17,21-trihydroxy-pregnadiene, which is reacted with an acylating agent as for example a lower alkanoic anhydride, such as acetic anhydride, propionic anhydride, butyric anhydride, benzoic anhydride, and the like, in the presence of a tertiary amine such as pyridine to form $\Delta^{4,8(9)}$-3,20-diketo-11,17-dihydroxy-21-acyloxy-pregnadiene as for example $\Delta^{4,8(9)}$-3,20-diketo-11,17-dihydroxy-21-acetoxy-pregnadiene, $\Delta^{4,8(9)}$-3,20-diketo-11,17-dihydroxy-21-propionoxy-pregnadiene, $\Delta^{4,8(9)}$-3,20-diketo-11,17-dihydroxy-21-butyroxy-pregnadiene, $\Delta^{4,8(9)}$-3,20-diketo-11,17-dihydroxy-21-benzoxy-pregnadiene, and the like.

The following example illustrates a method of carrying out the present invention but it is to be understood that this example is given for purposes of illustration and not of limitation.

Example 1

A solution of 3 parts of $\Delta^{4}$-9-bromo-3,11,20-triketo-17,21-dihydroxy-pregnene (9-bromo-cortisone) in 50 parts of collidine is heated for one hour under reflux, and the collidine is evaporated in vacuo. The residual material is dissolved in chloroform, and the chloroform extract is washed with dilute aqueous hydrochloric acid, then with water, dried, and evaporated to dryness in vacuo. The residual material is purified by chromatography followed by recrystallization from ethyl acetate to give $\Delta^{4,8(9)}$-3,11,20-triketo-17,21-dihydroxy-pregnadiene.

A mixture of 0.5 part of $\Delta^{4,8(9)}$-3,11,20-triketo-17,21-dihydroxy-pregnadiene, 0.5 parts of anhydrous sodium acetate, 0.62 part of semicarbazide hydrochloride and 35 parts of 95% ethanol is heated at a temperature of about 70° C. for about 3 hours. The reaction mixture is evaporated to small volume in vacuo, the concentrated solution is diluted with water, and the insoluble material which precipitates is recovered by filtration, washed with water and dried. The resulting material is purified by chromatography followed by recrystallization from alcohol to give $\Delta^{4,8(9)}$-3,11,20-triketo-17,21-dihydroxy-pregnadiene 3,20-bis-semicarbazone.

To a suspension of 0.2 part of lithium borohydride in 10 parts of anhydrous tetrahydrofuran is added, dropwise with stirring over a 30-minute period, a solution of 0.44 part of $\Delta^{4,8(9)}$-3,11,20-triketo-17,21-dihydroxy-pregnadiene 3,20-bis-semicarbazone in 2.5 parts of dimethylformamide and 5 parts of tetrahydrofuran, while maintaining the reaction mixture at a temperature of about 25° C. The resulting mixture is stirred for an additional 40 minutes at 25° C., 20 parts of a 10% aqueous solution of acetic acid is added cautiously to the mixture thereby decomposing excess lithium borohydride. The clear solution is evaporated in vacuo nearly to dryness, the residual material is slurried with 10 parts of water, and the insoluble material is recovered by filtration, washed with water, and dried to give $\Delta^{4,8(9)}$-3,20-diketo-11,17,21-trihydroxy-pregnadiene 3,20-bis-semicarbazone.

A mixture of 0.3 parts of $\Delta^{4,8(9)}$-3,20-diketo-11,17,21-trihydroxy-pregnadiene 3,20-bis-semicarbazone, 5 parts of glacial acetic acid, 1.5 parts of water, 0.85 parts of sodium acetate, and 0.8 parts of 90% aqueous pyruvic acid is heated under nitrogen for 4 hours at about 75° C. The reaction mixture is diluted with 20 parts of water, and the aqueous mixture is evaporated nearly to dryness in vacuo. The residual material is slurried with water, and the organic material is extracted with ethyl acetate. The ethyl acetate solution is washed until neutral, dried, decolorized, and evaporated to dryness. The residual material is purified by chromatography followed by recrystallization from ethyl acetate-ether to give $\Delta^{4,8(9)}$-3,20-diketo-11,17,21-trihydroxy-pregnadiene. The latter material is reacted with an excess of acetic anhydride in pyridine at room temperature for a period of about 15 hours, and the crude acetylated product is purified by chromatography followed by recrystallization from ethyl acetate to give substantially pure $\Delta^{4,8(9)}$-3,20-diketo-11,17-dihydroxy-21-acetoxy-pregnadiene.

Various changes and modifications may be made in carrying out the present invention without departing from the spirit and scope thereof. Insofar as these changes and modifications are within the purview of the annexed claims, they are to be considered as part of this invention.

I claim:
1. $\Delta^{4,8(9)}$-3,20-diketo-11,17-dihydroxy-21-oxygenated-pregnadiene having the following formula:

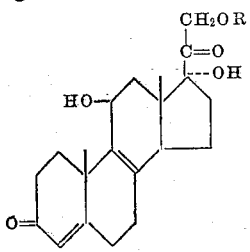

wherein R is a substituent selected from the group which consists of hydrogen and lower hydrocarbon carbonyl substituents.

2. $\Delta^{4,8(9)}$-3,20-diketo-11$\beta$,17$\alpha$,21-trihydroxy-pregnadiene.

3. $\Delta^{4,8(9)}$-3,20-diketo-11,17-dihydroxy-21-lower hydrocarbon carbonyloxy-pregnadiene.

4. $\Delta^{4,8(9)}$-3,20-diketo-11$\beta$,17$\alpha$-dihydroxy-21-acetoxy-pregnadiene.

5. $\Delta^{4,8(9)}$-3,20-diketo-11$\beta$,17$\alpha$-dihydroxy-21-benzoxy-pregnadiene.

6. The process which comprises reacting $\Delta^{4,8(9)}$-3,11,20-triketo-17,21-dihydroxy-pregnadiene with semicarbazide to form the 3,20-bis-semicarbazone, reacting this 3,20-bis-semicarbazone with an alkali borohydride to form $\Delta^{4,8(9)}$-3,20-diketo-11,17,21-trihydroxy-pregnadiene 3,20-bis-semicarbazone, reacting the latter compound with a hydrolyzing agent to produce $\Delta^{4,8(9)}$-3,20-diketo-11,17,21-trihydroxy-pregnadiene, and reacting this $\Delta^{4,8(9)}$-3,20-diketo-11,17,21-trihydroxy-pregnadiene with a lower hydrocarbon carboxylic acylating agent thereby forming $\Delta^{4,8(9)}$-3,20-diketo-11,17-dihydroxy-21-lower hydrocarbon carbonyloxy-pregnadiene.

7. The process which comprises reacting $\Delta^{4,8(9)}$-3,11,20-triketo-17$\alpha$,21-dihydroxy-pregnadiene with semicarbazide to form $\Delta^{4,8(9)}$-3,11,20-triketo-17$\alpha$,21-dihydroxy-pregnadiene 3,20-bis-semicarbazone, reacting this 3,20-bis-semicarbazone with lithium borohydride to form $\Delta^{4,8(9)}$-3,20-diketo-11$\beta$,17$\alpha$,21-trihydroxy-pregnadiene 3,20-bis-semicarbazone, reacting this compound with a mixture of dilute aqueous hydrochloric acid and chloroform to produce $\Delta^{4,8(9)}$-3,20-diketo-11$\beta$,17$\alpha$,21-trihydroxy-pregnadiene, and reacting the latter compound with acetic anhydride thereby forming $\Delta^{4,8(9)}$-3,20-diketo-11$\beta$,17$\alpha$-dihydroxy-21-acetoxy-pregnadiene.

References Cited in the file of this patent
UNITED STATES PATENTS

| | | |
|---|---|---|
| 2,409,798 | Reichstein | Oct. 22, 1946 |
| 2,734,897 | Chemerda | Feb. 14, 1956 |
| 2,740,797 | Laubach | Apr. 3, 1956 |

FOREIGN PATENTS

| | | |
|---|---|---|
| 1,052,936 | France | Sept. 30, 1953 |